US009588760B1

(12) United States Patent
Bostick et al.

(10) Patent No.: US 9,588,760 B1
(45) Date of Patent: Mar. 7, 2017

(54) SOFTWARE APPLICATION DEVELOPMENT FEATURE AND DEFECT SELECTION

(71) Applicant: International Business Machines Corporation, Armonk, NY (US)

(72) Inventors: James E. Bostick, Cedar Park, TX (US); Hernan A. Cunico, Holly Springs, NC (US); John M. Ganci, Jr., Cary, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 14/949,995

(22) Filed: Nov. 24, 2015

(51) Int. Cl.
G06F 9/44 (2006.01)

(52) U.S. Cl.
CPC .................................... G06F 8/71 (2013.01)

(58) Field of Classification Search
None
See application file for complete search history.

(56) References Cited

U.S. PATENT DOCUMENTS

| | | | | |
|---|---|---|---|---|
| 6,336,217 B1 * | 1/2002 | D'Anjou | ................... | G06F 8/71 707/999.202 |
| 8,015,541 B1 * | 9/2011 | Srinivasan | ................ | G06F 8/20 717/104 |
| 8,418,137 B2 * | 4/2013 | Hoche | .................... | G06F 8/443 717/121 |
| 8,572,552 B2 * | 10/2013 | Kennaley | ................. | G06F 8/10 717/104 |
| 8,595,151 B2 * | 11/2013 | Hao | ...................... | G06Q 10/00 705/1.1 |
| 8,635,590 B1 * | 1/2014 | Ogilvie | ..................... | G06F 8/70 717/110 |
| 8,763,131 B2 | 6/2014 | Archer et al. | | |
| 9,009,024 B2 * | 4/2015 | Zhang | ................. | G06F 17/2785 704/10 |
| 9,038,054 B1 * | 5/2015 | Kozak | .................... | G06Q 30/02 717/170 |
| 2003/0033586 A1 * | 2/2003 | Lawler | ..................... | G06F 8/20 717/101 |
| 2009/0119637 A1 * | 5/2009 | Ganapathy | ............. | G06Q 10/06 717/101 |

(Continued)

FOREIGN PATENT DOCUMENTS

WO   2013163249 A1   10/2013

OTHER PUBLICATIONS

De O. Coelho, Ha et al.; "An Integrated Approach to Develop Pervasive Mobile Applications"; 2007; 8 pages.

(Continued)

*Primary Examiner* — Tuan Q. Dam
*Assistant Examiner* — Zheng Wei
(74) *Attorney, Agent, or Firm* — Isaac J. Gooshaw

(57) ABSTRACT

A method, computer program product, and computer system is provided. A processor receives information indicative of an application. A processor retrieves one or more opinion sources for the application. A processor identifies at least one feature request based on the one or more opinion sources for the application. A processor determines a frequency of the at least one feature mentioned in the one or more opinion sources for the application. A processor generates a feature suggestion list including the at least one feature, where the feature suggestion list is ordered based on the frequency of the at least one feature mentioned in the one or more opinion sources for the application.

14 Claims, 4 Drawing Sheets

(56) References Cited

U.S. PATENT DOCUMENTS

| | | | | |
|---|---|---|---|---|
| 2009/0138855 | A1* | 5/2009 | Huene | G06F 11/3676 717/125 |
| 2009/0210857 | A1* | 8/2009 | Martineau | G06F 8/33 717/120 |
| 2010/0037204 | A1 | 2/2010 | Lin et al. | |
| 2010/0235807 | A1* | 9/2010 | Doddappa | G06F 8/10 717/101 |
| 2011/0185343 | A1* | 7/2011 | Repenning | G06F 8/20 717/113 |
| 2012/0110544 | A1* | 5/2012 | Novak | G06F 8/20 717/101 |
| 2013/0254737 | A1* | 9/2013 | Lal | G06Q 10/06 717/101 |
| 2013/0254742 | A1* | 9/2013 | Hockings | G06F 8/70 717/120 |
| 2013/0282595 | A1* | 10/2013 | Vijayaraghavan | G06Q 30/016 705/304 |
| 2014/0195395 | A1 | 7/2014 | Bhakta et al. | |
| 2014/0282395 | A1* | 9/2014 | Wang | G06F 8/71 717/120 |
| 2015/0074546 | A1* | 3/2015 | Slawson | G06F 3/0484 715/747 |
| 2015/0088955 | A1 | 3/2015 | Hendrick et al. | |
| 2015/0169299 | A1* | 6/2015 | Sharma | G06F 8/61 717/104 |
| 2016/0291937 | A1* | 10/2016 | Khanna | G06F 8/10 |

OTHER PUBLICATIONS

Gudipati, Ambaprasad; "Continuous Delivery Platform"; An IP.com Prior Art Database Technical Disclosure; IP.com No. 000239080; IP.com Electronic Publication: Oct. 10, 2014; Copyright © 2014, Cognizant Technology US Corp; pp. 1-9.

Gudipati et al.; "One Mobile Development Studio"; An IP.com Prior Art Database Technical Disclosure; IP.com No. 000227878; IP.com Electronic Publication: May 24, 2013; Copyright © 2013, Cognizant Technology Solutions US Corp; 7 pages.

Henkes, Matt; "Apptrace takes the pain out of app review insight with sentiment analysis"; developer tech; Dec. 6, 2012; pp. 1-8.

Lim et al.; "History-based Dynamic Estimation of Energy Consumption for Mobile Applications"; ICACT2014; Feb. 16-19, 2014; pp. 714-718.

Williamson, Leigh; "Add IBM Mobile Quality Assurance to your mobile quality regimen"; IBM, developerWorks; Mar. 4, 2014; © copyright IBM Corporation 2014; pp. 1-7.

"A Policy-controlled Adaptive Platform for Querying Realtime SmartPhone Data"; An IP.com Prior Art Database Technical Disclosure; IP.com No. 000228639; IP.com Electronic Publication: Jun. 26, 2013; pp. 1-9.

"Sentiment Analysis"; Splunk Apps; Printed on: Nov. 11, 2014; Copyright © 2005-2014, Splunk Inc, 2 pages.

"Tealeaf CX Mobile"; IBM, Mobile Customer Experience Management; Printed on: Nov. 11, 2014; pp. 1-2.

* cited by examiner

SOFTWARE APPLICATION DEVELOPMENT FEATURE AND DEFECT SELECTION

BACKGROUND OF THE INVENTION

The present invention relates generally to the field of software application development, and more particularly to selecting features and defects to address.

Software application development is the process of designing, prototyping, and creating an application for use. During an application's lifetime, various features are added and defects fixed to a released product. New versions of the application are provided to users that incorporate the new features and fix defects from previous versions. As the application's lifetime progresses, the features and defects of the application can change drastically since the application was originally released.

SUMMARY

Embodiments of the present invention provide a method, system, and program product to provide feature or defect suggestions in an applications development. A processor receives information indicative of an application. A processor retrieves one or more opinion sources for the application. A processor identifies at least one feature request based on the one or more opinion sources for the application. A processor determines a frequency of the at least one feature mentioned in the one or more opinion sources for the application. A processor generates a feature suggestion list including the at least one feature, where the feature suggestion list is ordered based on the frequency of the at least one feature mentioned in the one or more opinion sources for the application.

DETAILED DESCRIPTION

Figure 1:
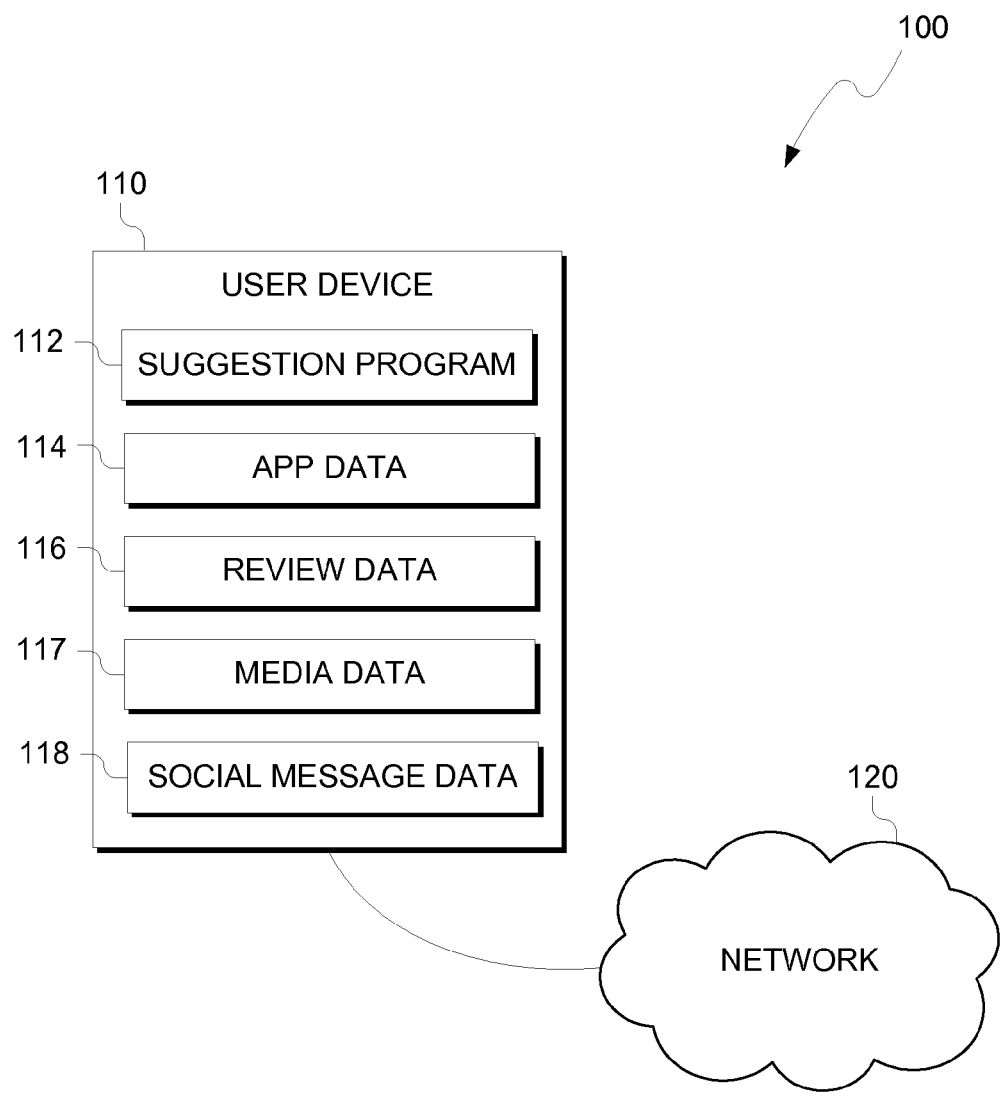
FIG. 1 is a functional block diagram illustrating a networked environment, in accordance with an exemplary embodiment of the present invention.

While solutions to new feature selection are known, they typically rely on the developers to determine the direction a new version of an application should be directed towards. Embodiments of the present invention recognize that by analyzing various sources of opinion data for a particular application, that new features or existing defects can be found and then ranked to provide suggestions on the features to add to an application or the defects to fix in the next version. As such, application developers are able to prioritize certain areas of application development to match the user's opinions of current, or previous, versions of the applications. Embodiments of the present invention also recognize that by comparing version changes (e.g., the features added or defects fixed in each version of a competitor application) and respective opinion related to each version, suggestions can be provided to an application developer that includes popular, or unpopular, features to incorporate into the application's next version.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 connected to network 120. User device 110 includes suggestion program 112, app data 114, review data 116, media data 117, and social message data 118.

In various embodiments of the present invention, user device 110 is a computing device that can be a standalone device, a server, a laptop computer, a tablet computer, a netbook computer, a personal computer (PC), or a desktop computer. In another embodiment, user device 110 represents a computing system utilizing clustered computers and components to act as a single pool of seamless resources. In general, user device 110 can be any computing device or a combination of devices with access to app data 114, review data 116, media data 117, and social message data 118 and is capable of executing suggestion program 112. User device 110 may include internal and external hardware components, as depicted and described in further detail with respect to FIG. 3.

In this exemplary embodiment, suggestion program 112, app data 114, review data 116, media data 117, and social message data 118 are stored on user device 110. However, in other embodiments, suggestion program 112, app data 114, review data 116, media data 117, and social message data 118 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between user device 110 and other devices or servers (not shown), in accordance with a desired embodiment of the present invention.

In various embodiments, suggestion program 112 generates an ordered list of application features and defects to address in a next release or version of a software application. Suggestion program 112 gathers opinions from a variety of sources regarding the application and, in some embodiments, competitor applications or other similar applications. Based on the content of the opinions, suggestion program 112 determines frequently requested features or mentioned defects. In some embodiments, suggestion program 112 compares features and defects mentioned in opinion to previous changes made in an application or competing application to determine a reaction to the changes made in previous versions. Suggestion program 112 provides an ordered list of features and defects based on the impact the changes made, such as increased sales or ratings of the application.

In various embodiments, suggestion program 112 receives app data 114. App data 114 includes information indicating an application to generate a list of suggested features. In some embodiments, app data 114 includes a description of the application, including current features of the application. In one scenario, the application is available on one or more application stores. App data 114 a link to the store page of the application. Suggestion program 112 retrieves a description from the store page. In another scenario, app data 114 includes a description of the application. Suggestion program 112 performs Natural Language Processing (NLP) to the description in order to determine the features offered by the application. In some embodiments, app data 114 includes a version history of the application. The version history includes version names or numbers (e.g., Beta 1.3a), a feature description for each version, and the dates the versions became available or released.

For example, one app description includes the excerpt "Social Network Integration". Suggestion program 112 identifies the text through NLP and determines the application includes social networking features. In another example, another application's description includes the text "Post message to SOCIAL NETWORK", where SOCIAL NETWORK is a particular social network. Suggestion program 112 identifies the text through NLP and determines the application has social networking features. Furthermore, suggestion program 112 identifies the specific type of social network and determines the application includes another feature indicating the specific type of social network integration. In some scenarios, suggestion program 112 generates a separates feature for the particular social network integration. In another embodiment, suggestion program 112 generates a sub-category within the general social network integration feature for the particular types of social networks that are integrated with the application.

In various embodiments, suggestion program 112 retrieves review data 116 from a variety of sources. In some scenarios, suggestion program 112 retrieves opinions from various platforms providing the application. Review data 116 includes user reviews and rating posted by users of the application. For example, the application is a mobile application offered on an app store. Suggestion program 112 retrieves application rating information and application review comments from the app store. Suggestion program 112 stores the retrieved application rating information and application review comments in review data 116. Application rating information includes numerical or other types of rating (e.g., 3 and ½ stars). Application review comments include written reviews or other opinions that accompany a user review for the application. In some embodiments, application rating information includes both overall ratings from all user and individual user ratings. In some embodiments, application review application includes ratings from various different stores with different rating systems. For example, one store uses a numerical rating of 10 out of 10 and another uses a five star rating system. In such embodiments, suggestion program 112 normalizes the ratings to a common scale. For example, both stores rating are normalized to a one hundred point scale (e.g., a "5.5/10" becomes a 55 and "3 stars out of 5" becomes 60). One of ordinary skill in the art will appreciate that any normalization of rating may be used without deviating from the invention.

In various embodiments, suggestion program 112 retrieves media data 117 from one or more media websites such as blogs, tech websites, and other web page postings discussing the application. In some embodiments, suggestions program 112 searches specific or known websites for reviews about the application. For example, a web site includes a search engine to find review about applications. Suggestion program 112 searches the website with the name of the application to find review web pages with reviews of the application. In other scenarios, suggestion program 112 queries a search engine with an index of various websites. In such scenarios, suggestion program 112 includes web pages with reviews of the application in the retrieval of media data 117. In various embodiments, media data 117 includes the text of the review retrieved from the web page. In some embodiments, media data 117 includes a rating from the review. In some scenarios, suggestion program 112 normalizes rating for compassion among different metrics used by various web pages.

In various embodiments, suggestion program 112 retrieves social message data 118 from a variety of social network platforms. On a given social network platform, users post messages to communicate with other users of the social network. Suggestion program 112 searches messages posted on the social network for messages mentioning or about the application. For example, suggestion program 112 searches for messages including the application's name. As another example, suggestion program 112 searches for tags of other information indicative of the application. In some embodiments, the developers of the application maintain a social network presence on the variety of social network platform. In such embodiments, suggestion program 112 includes messages posted by user to the accounts or groups associated with the application developer in social message data 118.

In some embodiments, suggestion program 112 determines a version associated with the opinions gathers in review data 116, media data 117 and social message data 118. In some scenarios, an opinion includes information indicating the version number reviewed or commented on by a user. For example, app stores include a version with reviews. As another example, a blog post in media data 117 includes a version number in the body of the web page or in the title of the web page. In other scenarios, suggestion program 112 compares the time the opinion was posted to determine a version number associated with the opinion. For example, app data 114 includes version numbers and the times or dates the particular versions became available (i.e., a version history). Suggestion program 112 compares the version history to a date when an opinion was posted or made available. Suggestion program 112 identifies the version that was available when an opinion was posted, assigning the corresponding version number to the opinion.

In some embodiments, suggestion program 112 retrieves app data 114 and opinions (e.g., review data 116, media data 117, and social message data 118) regarding competitor of similar applications. Based on the opinions for competitor or similar applications, suggestion program 112 determines features and defects addressed by said applications and the impact the features and defects had sales, reviews, or prominence of the feature. Suggestion program 112 retrieve app data 114 such as feature descriptions and version history from various app stores the competitor or similar app is offered. In some scenarios, suggestion program 112 also retrieves historic sales and rating information from app stores. Accordingly, suggestion program 112 can compare version changes and opinions corresponding to the version changes to determine the impact on sales and ratings.

In various embodiments, opinions regarding the application, and competing applications, are retrieved in an unstructured text format. User reviews in review data 116, blog posts and media reviews in media data 117, and social network posts regarding the applications are typically written in unstructured text. Unstructured text typically refers to information that either does not have a pre-defined data model or is not organized in a pre-defined manner. For example, user reviews may be short one sentence opinions, or longer, thought out opinions. As such, suggestion program 112 performs NLP and sentiment analysis to determine the features and defects mentioned in the retrieved opinions indicated in the unstructured text retrieved in review data 116, media data 117, and social message data 118. Suggestion program 112 analyzes the text of each opinion to determine a relative importance of each app feature and defect. For example, suggestion program 112 uses a NLP algorithm to determine the most commonly discussed features of an app based upon the number of times that feature is mentioned in review data 116, media data 117 or social message data 118. For example, two opinions state "fast load times" and "loads quickly". By NLP, suggestion program 112 determines the two opinions are referring to a "load"

feature. Conversely, two other opinions state "crashes" and "stalls". Suggestion program 112 determines that both opinions mention a defect of "stability". Based on the content of each opinion, suggestion program 112 determines the features and defects mentioned in the opinion. For all opinions regarding the application that were retrieved, suggestion program 112 determines the percentage or frequency the features or defects where mentioned. For example, suggestion program 112 determines mentioned features for opinions of an application include a location check-in feature (mentioned in 18% of opinions), social sharing (12%), and leaderboards (3%).

In various embodiments, suggestion program 112 determines a sentiment expressed in opinions regarding the application. Suggestion program 112 determines if the opinion contains a positive or negative sentiment relating to mentioned features or defects. Suggestion program 112 retrieves the feature and defect list determined in by NLP algorithm and determines the sentiment associated with the features mentioned in the opinion. For example, the location check-in feature is mentioned in a review. An app store review in review data 116 mentions that the "the check-in is a useful feature." Suggestion program 112 determines the "location check-in" feature is mentioned and the opinion includes a positive sentiment regarding the feature (i.e., useful indicates a positive or appreciative opinion). As another example, a blog post in media data 117 mentions that the application "the check in feature is slow." Suggestion program 112 determines that the "location check-in" feature is mentioned again. However, suggestion program 112 determines the opinion includes a negative sentiment (i.e., "slow" indicates an opinion of poor performance).

In various embodiments, suggestion program 112 includes the sentiment of opinions when determining a list of suggested features based on opinions of the current version of the application. For example, suggestion program 112 suggests a list of features based on the frequency the features are mentioned. In further embodiments, suggestion program 112 includes a tally of positive mentions of a feature and negative mentions of a feature in various opinions stored in review data 116, media data 117, and social message data 118. Based on the ratio of positive and negative sentiment for a review, suggestion program 112 determines the features order on the list. For features that have a larger number of opinions with positive sentiment, suggestion program 112 orders the feature lower on the list, as the feature is popular for the current version and need not to be adjusted at this time. For features with larger amounts of negative sentiment, suggestion program 112 order the feature higher on the list, since the feature is often critiqued in opinions.

In various embodiments, suggestion program 112 determines the change in the application's rating based on change in features. Suggestion program 112 retrieves a version history for the application from app data 114. App data 114 includes a version history with a list of features for each version. Suggestion program 112 compares previous ratings for the application to newer ratings, based on when a particular version is released or made available (e.g., normalized ratings from various review data 116 and media data 117). For new features added between versions, suggestion program 112 determines a reception of the features based on the ratings change. If the ratings for a new version of the application increase, then suggestion program 112 determines the feature was well received. If the ratings for the new version of an application are lower, then suggestion program 112 determines the feature was not received well and suggests the feature to be fixed (e.g., as a defect) in the suggested list of features and defects.

In some embodiments, suggestion program 112 combines sentiment analysis and rating changes to determine additional ordering in the suggested list. For example, a new feature has frequent negative sentiment in opinions and, when added, correlates to a lower rating in the application. In response, suggestion program 112 orders the negatively mentioned new feature higher in the list. Conversely, a feature that was also added in the same version (e.g., correlates to a drop in ratings) has less or no negative sentiment in opinions. In response, suggestion program 112 orders the less mentioned new feature lower in the list. This is due to the feature being included in an unpopular version, but, based on sentiment determined by suggestion program 112, may not be the cause of the decrease in user ratings.

In various embodiments, suggestion program 112 determines features of competitor or similar applications. Based on opinions regarding the competitor applications (e.g., review data 116, media data 117 and social message data 118 regarding the competitor applications), suggestion program 112 determines features and defects mentioned (e.g., by a NLP algorithm) and a sentiment associated with the features and defects. Suggestion program 112 compares the sentiment of features to determine popular, or unpopular, features of the competitor applications. Suggestion program 112 compares the features of competitor applications and the respective sentiment to features of the application that a suggested feature list is being generated for by suggestion program 112. If competitor applications share features with the application, then suggestion program 112 includes features and defects with negative sentiment in the list. Shared features that are often criticized in a competitor application offer features to focus development into, in order to avoid similar critiques. If competitor apps do not share features with the application, then suggestion program 112 includes the features on the list if the competitor features have a positive sentiment. Popular features in competitor applications that are not included in the applications are suggested to focus development on features attracting users to the competitor applications.

In various embodiments, suggestion program 112 determines the ratings impact version histories had on competitor applications. Based on the when a feature was introduced in the version history, suggestion program 112 determines a change in ratings for the competitor applications for each feature. For features with a positive impact on ratings, suggestion program 112 includes the feature on the list in a higher order than features with smaller or negative impact on the ratings when introduced. For example, a competitor application introduced a feature to enable push notifications. After the feature was introduced, suggestion program 112 determines user ratings increased by 20%. Similarly, suggestion program 112 determines that opinions posted after the feature was introduced include overall positive sentiment regarding the feature. Therefore, suggestion program 112 includes the "push notification" feature highly on the list. In various embodiments, suggestion program 112 compares the change in sales or downloads of competitor applications based on introduced features in competitor applications. Suggestion program 112 retrieves sales or download reports for competitor applications. Suggestion program 112 compares the sales or download history to the version history of the competitor applications. For introduced features that correlate to an increase in sales or downloads, suggestion program 112 determines the feature is popular and includes the feature on the suggested list.

In various embodiments, suggestion program 112 generates a list of suggested features or defects for an application developer to include or focus development resources on based on the opinions and ratings of the application, in addition to opinions, ratings, sales, and downloads of competing applications. In some embodiments, suggestion program 112 receives from a user a preferred metric to generate the list of suggestions. For example, suggestion program 112 orders the list of features and defects based on the impact on sales or downloads the feature or defect had on competing applications. Suggestion program 112 orders features with the larger impact on sales higher in the list (e.g., when introduced, sales for the competing application increased more than when another feature was introduced). As another example, suggestion program 112 orders the list of features and defects based on the impact of ratings a feature had on competing applications. For features that had a increased the rating of an application when introduced, suggestion program 112 orders feature with the larger impact on the rating higher in the list. As another example, suggestion program 112 orders the list based on the prominence or portion of opinions mentioning the feature. The more frequently mentioned a feature is in the opinions of an application, the higher the feature is suggested in the ordered list.

In some embodiments, suggestion program 112 generates a software application development plan based on the generated list of suggested features. For example, a highly ranked feature is included as a first feature selected in the development plan, where subsequently lower rated features are selected and added to the development plan. In some scenarios, suggestion plan 112 identifies an expected time to incorporate a new feature into a software application. Additionally, suggestion program 112 identifies a version update cycle for the software application. The app data 114 for the software application includes a update time table or update frequency which indicates the times when future updates of new versions will be made available. Based on the expected time of adding a new feature, suggestion program 112 selects a target date for adding the new feature to a corresponding version release.

Figure 2A:
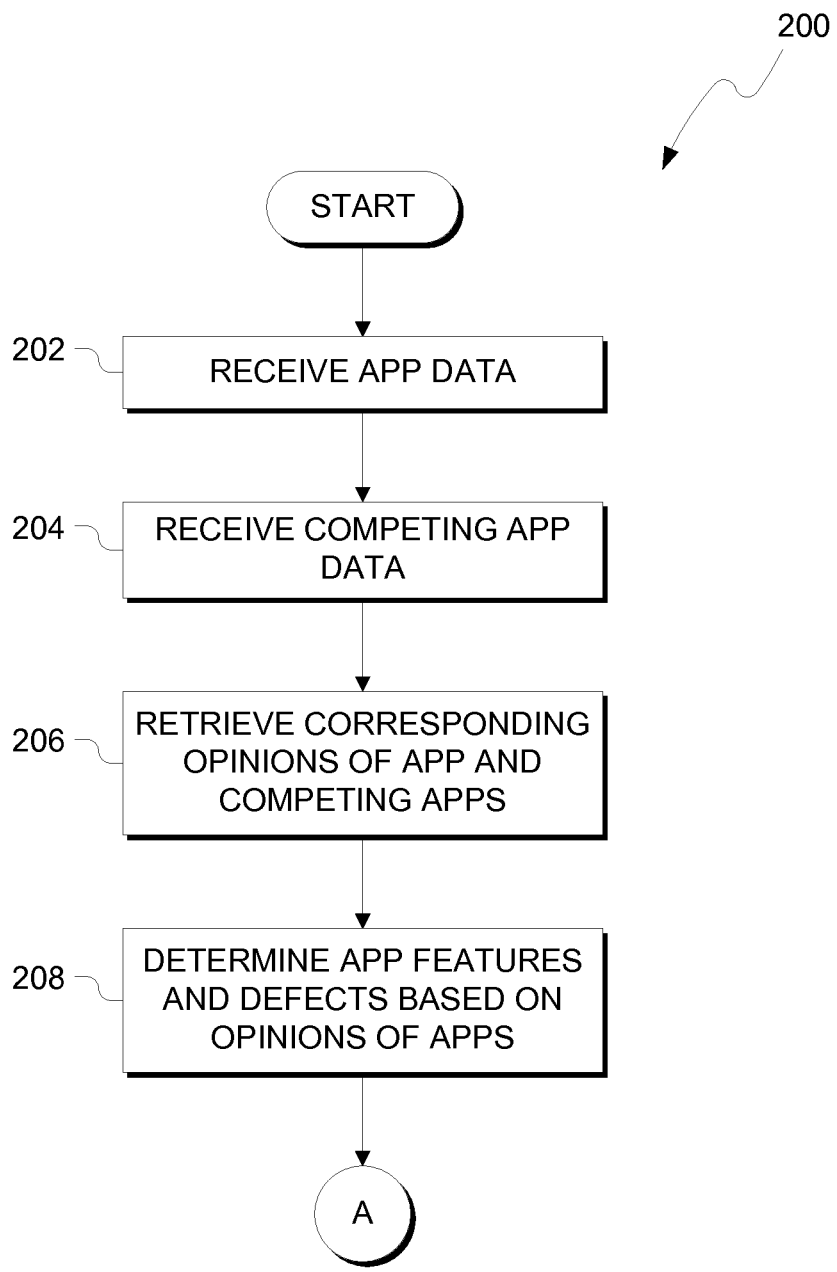
FIGS. 2A & 2B illustrate operational processes of a suggestion program on a computing device within the environment of FIG. 1, in accordance with an embodiment of the present invention.
Figure 2B:
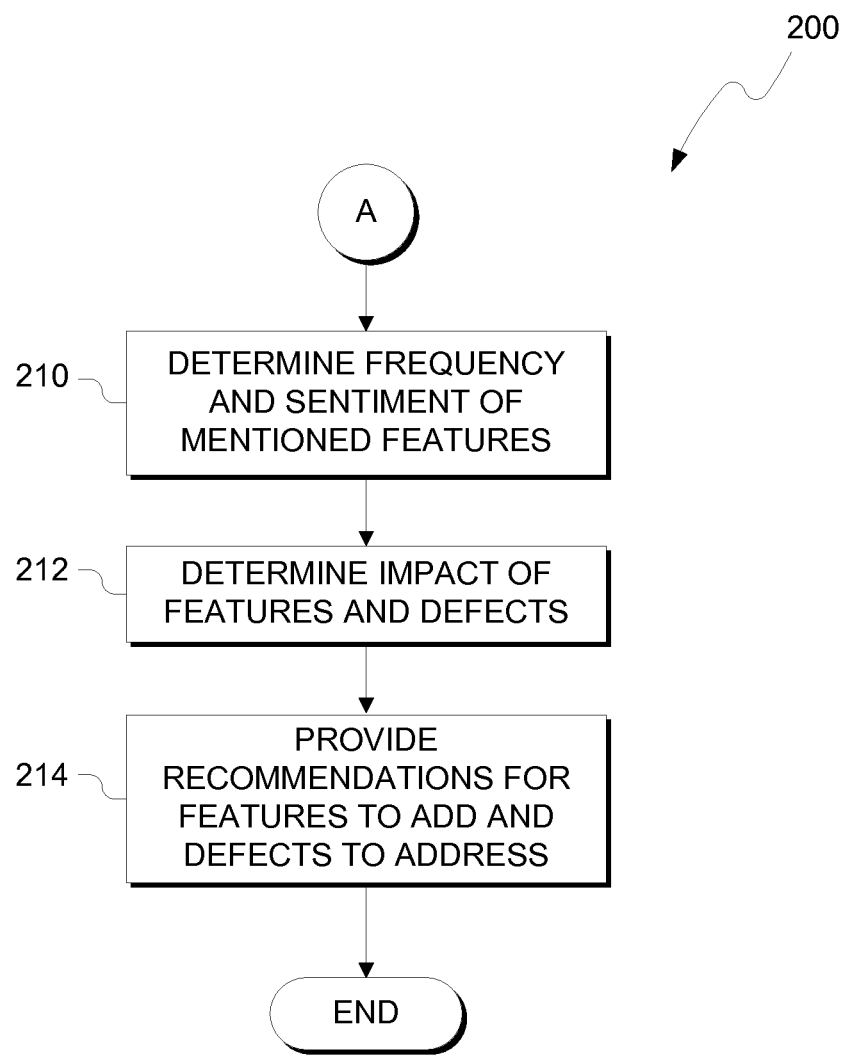

FIGS. 2A & 2B illustrate operational processes, generally designated 200, of a suggestion program on a computing device within the environment of FIG. 1. In process 202 suggestion program 112 receives application data (i.e., app data 114) for an application to generate a suggested feature and defect list. App data 114 includes a name and description of features of the application. In some scenarios, app data 114 also includes links to or other information indicative of where an application is available (e.g., app stores where users download and potentially review the application). In process 204, suggestion program 112 receives competitor application information. Suggestion program 112 receives app data 114 indicating competitor applications to monitor (e.g., names and descriptions of competing applications) in addition to links or other indicative information as to where the competing applications are available. In some embodiments, suggestion program 112 determines one or more competing applications without being provided by a user. For example, suggestion program 112 searches an application web-based storefront for applications with similar descriptions or feature list as the application that a suggestion list is being generated. Suggestion program 112 selects competing applications based on the search results. In another example, the application store includes a list of similar applications. Suggestion program 112 retrieves the list of similar applications for the application store, using the similar applications as competing applications in the following processes.

In process 206, suggestion program 112 retrieves opinion data regarding the application and any competing applications from a variety of sources as discussed herein (e.g., review data 116, media data 117, and social message data 118). In some embodiments, suggestion program 112 receives one or more sources to retrieve opinion data. In other embodiments, suggestion program 112 searches one or more application stores, media sources or social networks for opinion data regarding the application and competing applications. In process 208, suggestion program 112 determines the features and defects of the application and competing applications. Based on natural language processing of the retrieved opinions, suggestion program 112 determines the mentioned features in the opinions. In some embodiments, suggestion program 112 determines a sentiment for each mentioned feature in the opinions.

In process 210, suggestion program 112 determines the frequency and sentiment of the features mentioned in the retrieved opinions regarding the application and competing applications. Based on the comments made in an opinion, suggestion program 112 determines if the mentioned features are discussed with positive or negative sentiment. Positive sentiment indicates a user appreciates or likes a feature. Negative sentiment indicates a user dislikes a feature and as such views the feature defective. Suggestion program 112 determines the frequency each feature and defect is mentioned in opinion data. The more frequently mentioned a defect is in opinions of the application, suggestion program 112 places the defect as a suggestion to address in the list. For competing applications, suggestion program 112 ranks frequent positive mentions of a feature higher in the list.

In process 212, suggestion program 112 determines the impact of features and defects. For the application that a feature list is being generated for, suggestion program 112 determines the impact of features introduced in the current or past versions have had on sales, ratings or frequency of mentions in opinions. For features that have had a negative impact on sales or ratings (e.g., sales or ratings decreased when a feature was introduced), suggestion program 112 ranks the features higher in the suggested list than features with smaller negative impact or positive impact. For competing applications, suggestion program 112 rates introduced features that had a positive impact on sales or ratings for the competing applications higher on the suggested list than competing applications features that had less of an impact.

In process 214, suggestion program 112 provides a list of recommendations for features to add or improve to the applications and defects to address. In some embodiments, suggestion program 112 includes features or defects in the list that meet or exceed a certain amount of impact in sales or ratings or frequency in mentions in the list. For example, if a feature only increased ratings for a competitor's application by 5%, then suggestion program 112 does not include the feature in the list. However, if an introduced feature increased ratings for the competitor's application by 15%, then suggestion program 112 includes the feature in the list. Similarly, if a feature increased sales when introduced above a threshold level (e.g., sales increased 10%), then suggestion program 112 includes the feature. Regarding the frequency of mentions in opinion data, if a feature is mentioned in more than a pre-determined percentage of reviews (e.g., more than 12% of reviews mention the feature), then suggestion program 112 includes the feature in the list.

Figure 3:
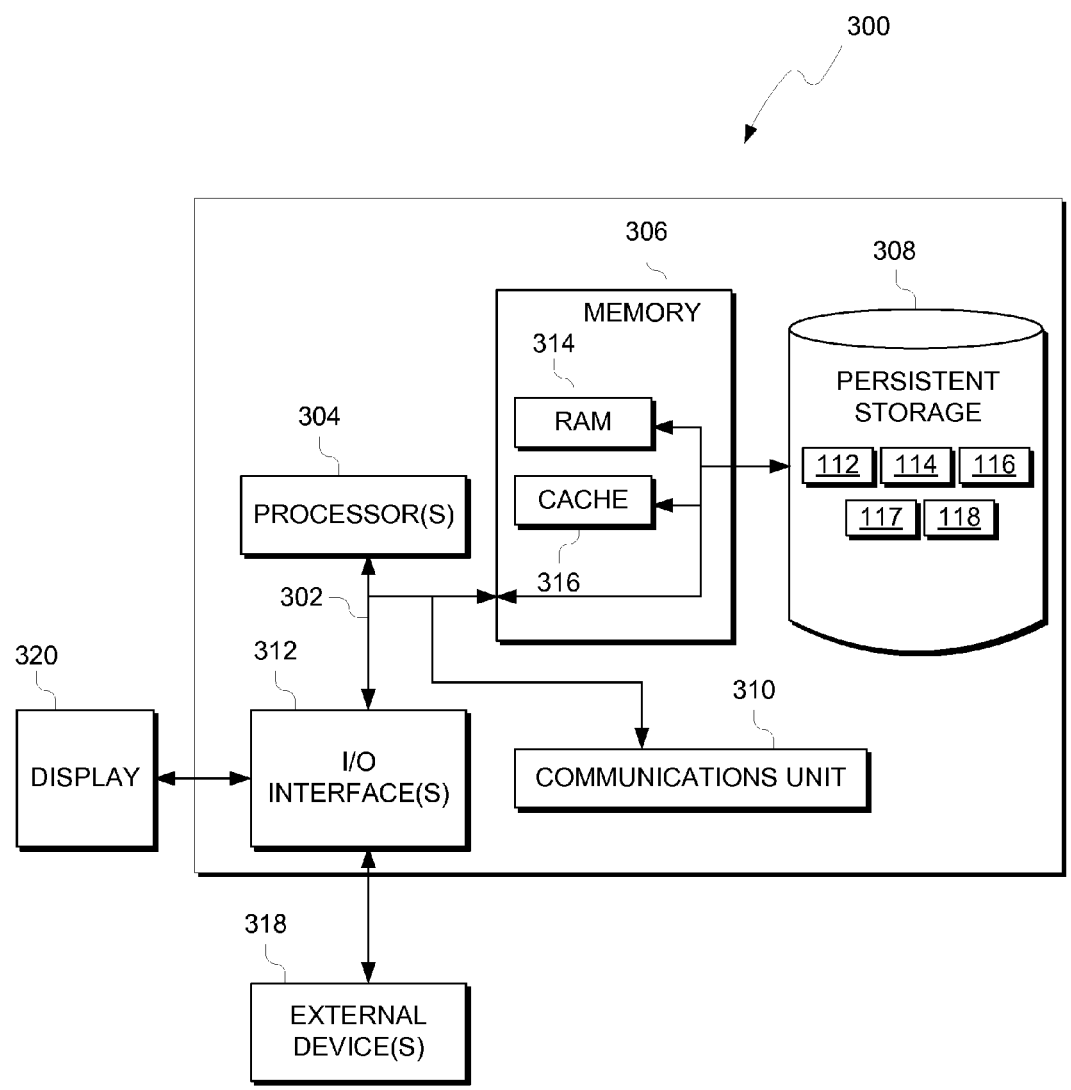
FIG. 3 depicts a block diagram of components of the computing device executing a suggestion program, in accordance with an embodiment of the present invention.

FIG. 3 depicts a block diagram, 300, of components of user device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

User device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Suggestion program 112, app data 114, review data 116, media data 117, and social message data 118 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 120. In these examples, communications unit 310 includes one or more network interface cards. Communications unit 310 may provide communications through the use of either or both physical and wireless communications links. Suggestion program 112, app data 114, review data 116, media data 117, and social message data 118 may be downloaded to persistent storage 308 through communications unit 310.

I/O interface(s) 312 allows for input and output of data with other devices that may be connected to user device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., suggestion program 112, app data 114, review data 116, media data 117, and social message data 118, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   receiving, by one or more processors, information indicative of a software application, wherein the information indicative of the software application includes one or more competing software applications to the software application;
   retrieving, by the one or more processors, one or more unstructured text data sources regarding the software application;
   identifying, by the one or more processors, a feature request based, at least in part, on the one or more unstructured text data sources regarding the software application, wherein the feature request indicates a function to include in the software application;
   determining, by the one or more processors, a frequency of the feature mentioned in the one or more unstructured text data sources regarding the software application;
   in response to the frequency of the feature mentioned in the one or more unstructured text data sources regarding the software application exceeding a threshold value, selecting, by the one or more processors, the function indicated in the feature request to be included in a new version of the software application;
   determining, by the one or more processors, one or more changes between a first version of the one of more competing software applications and a second version of the one or more competing software applications;
   determining, by the one or more processors, an impact of the determined one or more changes based, at least in part, on the one or more unstructured text data sources for the one or more competing software applications; and
   responsive to a determination that the impact of the determined one or more changes is above a threshold value, selecting, by the one or more processors, the one or more determined changes to be included in the new version of the software application.

2. The method of claim 1, wherein the information indicative of the application includes one or more of the following: (i) a version of the application; (ii) a range of versions for the application; and (iii) one or more platforms of the application.

3. The method of claim 1, wherein the threshold value is based on one of the following: (i) an impact of sales on the one or more competing software applications; (ii) an impact on ratings in the one or more unstructured text data sources for the one or more competing software applications; and (iii) an impact on frequency the one or more changes are mentioned in the one or more unstructured text data sources for the one or more competing software applications.

4. The method of claim 1, wherein the feature request indicates a request to fix a defect in a current version of the software application.

5. The method of claim 1, wherein the one or more unstructured text data sources for the software application include one or more of the following: (i) one or more reviews from a store page associated with the software application; (ii) one or more articles from web page articles reviewing the software application; and (iii) one or more social network messages associated with the software application.

6. A computer program product comprising:
one or more computer-readable storage media and program instructions stored on the one or more computer-readable storage media, the program instructions comprising:
program instructions to receive information indicative of an application, wherein the information indicative of the software application includes one or more competing software applications to the software application;
program instructions to retrieve one or more unstructured text data sources regarding the application;
program instructions to identify at least one feature request based, at least in part, on the one or more unstructured text data sources regarding the application;
program instructions to determine a frequency of the at least one feature mentioned in the one or more unstructured text data sources regarding for the application;
program instructions to generate a feature suggestion list including the at least one feature, wherein the feature suggestion list is ordered based, at least in part, on the frequency of the at least one feature mentioned in the one or more unstructured text data sources regarding for the application;
program instructions to determine one or more changes between a first version of the one of more competing software applications and a second version of the one or more competing software applications;
program instructions to determine an impact of the one or more changes based, at least in part, on one or more unstructured text data sources for the one or more competing software applications; and
responsive to a determination that the impact of the one or more changes is above a threshold value, program instructions to select the one or more changes to be included in the new version of the software application.

7. The computer program product of claim 6, wherein the information indicative of the application includes one or more of the following: (i) a version of the application; (ii) a range of versions for the application; and (iii) one or more platforms of the application.

8. The computer program product of claim 6, wherein the threshold value is based on one of the following: (i) an impact of sales on the one or more competing applications; (ii) an impact on ratings in the one or more unstructured text data sources for the one or more competing applications; and (iii) an impact on frequency the one or more changes are mentioned in the one or more unstructured text data sources for the one or more competing applications.

9. The computer program product of claim 6, wherein the feature request is for to fix a defect in a current version of the application.

10. The computer program product of claim 6, wherein the one or more unstructured text data sources for the application include one or more of the following: (i) one or more reviews from a store page associated with the application; (ii) one or more articles from web page articles reviewing the application; and (iii) one or more social network post associated with the application.

11. A computer system comprising:
one or more computer processors;
one or more computer readable storage media; and
program instructions stored on the computer readable storage media for execution by at least one of the one or more processors, the program instructions comprising:
program instructions to receive information indicative of an application, wherein the information indicative of the software application includes one or more competing software applications to the software application;
program instructions to retrieve one or more unstructured text data sources regarding the application;
program instructions to identify at least one feature request based, at least in part, on the one or more unstructured text data sources regarding the application;
program instructions to determine a frequency of the at least one feature mentioned in the one or more unstructured text data sources regarding the application;
program instructions to generate a feature suggestion list including the at least one feature, wherein the feature suggestion list is ordered based, at least in part, on the frequency of the at least one feature mentioned in the one or more unstructured text data sources regarding the application;
program instructions to determine one or more changes between a first version of the one of more competing software applications and a second version of the one or more competing software applications;
program instructions to determine an impact of the one or more changes based, at least in part, on one or more unstructured text data sources for the one or more competing software applications; and
responsive to a determination that the impact of the one or more changes is above a threshold value, program instructions to select the one or more changes to be included in the new version of the software application.

12. The computer system of claim 11, wherein the information indicative of the application includes one or more of the following: (i) a version of the application; (ii) a range of versions for the application; and (iii) one or more platforms of the application.

13. The computer system of claim 11, wherein the threshold value is based on one of the following: (i) an impact of sales on the one or more competing applications; (ii) an impact on ratings in the one or more unstructured text data sources for the one or more competing applications; and (iii) an impact on frequency the one or more changes are mentioned in the one or more unstructured text data sources for the one or more competing applications.

14. The computer system of claim 11, wherein the feature request is for to fix a defect in a current version of the application.

\* \* \* \* \*